United States Patent

Goodale

[15] 3,646,977
[45] Mar. 7, 1972

[54] BROCCOLI TRIMMING MACHINE

[72] Inventor: Richard J. Goodale, Watsonville, Calif.
[73] Assignee: Goodale Manufacturing Company, Inc., Watsonville, Calif.
[22] Filed: Apr. 27, 1970
[21] Appl. No.: 32,088

[52] U.S. Cl. ............................................. 146/78 R, 146/81
[51] Int. Cl. ......................................A23n 15/04, B26d 3/26
[58] Field of Search................. 146/78 R, 78 A, 81, 131, 132, 146/133, 151, 149

[56] References Cited

UNITED STATES PATENTS

| | | | |
|---|---|---|---|
| 3,478,795 | 11/1969 | Thornsbery | 146/78 R |
| 2,716,480 | 8/1955 | Dotta | 146/81 X |
| 3,374,881 | 3/1968 | Schwacofer | 146/81 X |

*Primary Examiner*—Willie G. Abercrombie
*Attorney*—Allen and Chromy

[57] ABSTRACT

A broccoli trimming machine that is provided with a rotatable mechanism having a plurality of broccoli gripping means adapted to be rotated past a plurality of stations including a loading station A, a first slitting station B, a second slitting station C and a discharge station D. The broccoli gripping means are rotated past these stations in step-by-step motion by a Geneva-type drive. The slitting knives are attached to an endless chain which moves the knives in predetermined orbits. The broccoli gripping devices are closed by a system of cams while each broccoli gripping device is at the loading station. Rotating the broccoli gripping devices past the stations as well as opening and closing the gripping devices and moving the knives through their orbits is accomplished by a suitable drive mechanism in timed relation.

10 Claims, 5 Drawing Figures

INVENTOR.
Richard J. Goodale

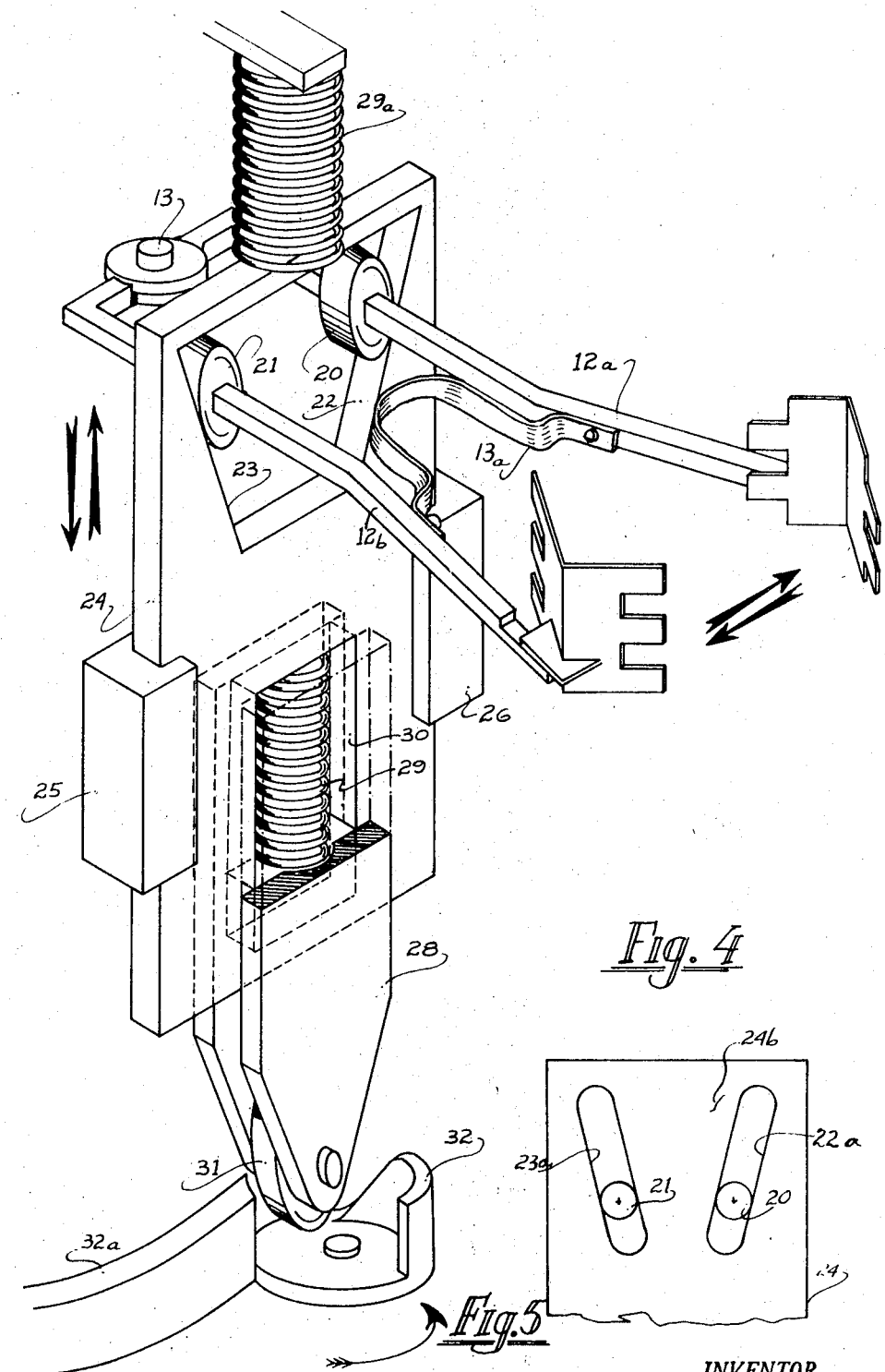

3,646,977

BROCCOLI TRIMMING MACHINE

DESCRIPTION OF THE INVENTION

This invention relates to a broccoli slitting and trimming apparatus.

An object of this invention is to provide an improved device for slitting and trimming broccoli.

Another object of this invention is to provide an improved device for slitting and trimming broccoli which is economical to manufacture and reliable in operation.

Another object of this invention is to provide an improved broccoli slitting and trimming device which employs a plurality of broccoli gripping means that are adapted to be rotated past broccoli slitting knives moving in predetermined orbits.

Still another object of this invention is to provide an improved broccoli slitting and trimming apparatus in which the broccoli gripping means are opened and closed and rotated in certain timed relation with respect to the motion of the slitting knives, all of these operations and motions being powered by a single motor through a unique transmission unit.

Other and further objects of this invention will be apparent to those skilled in the art to which it relates from the following specification, claims and drawing in which, briefly:

FIG. 4 is a detail view showing the mechanism for opening and closing the broccoli gripping means; and FIG. 5 is a fragmentary detail view of a modified mechanism for opening and closing the broccoli gripping means.

Figure 1:
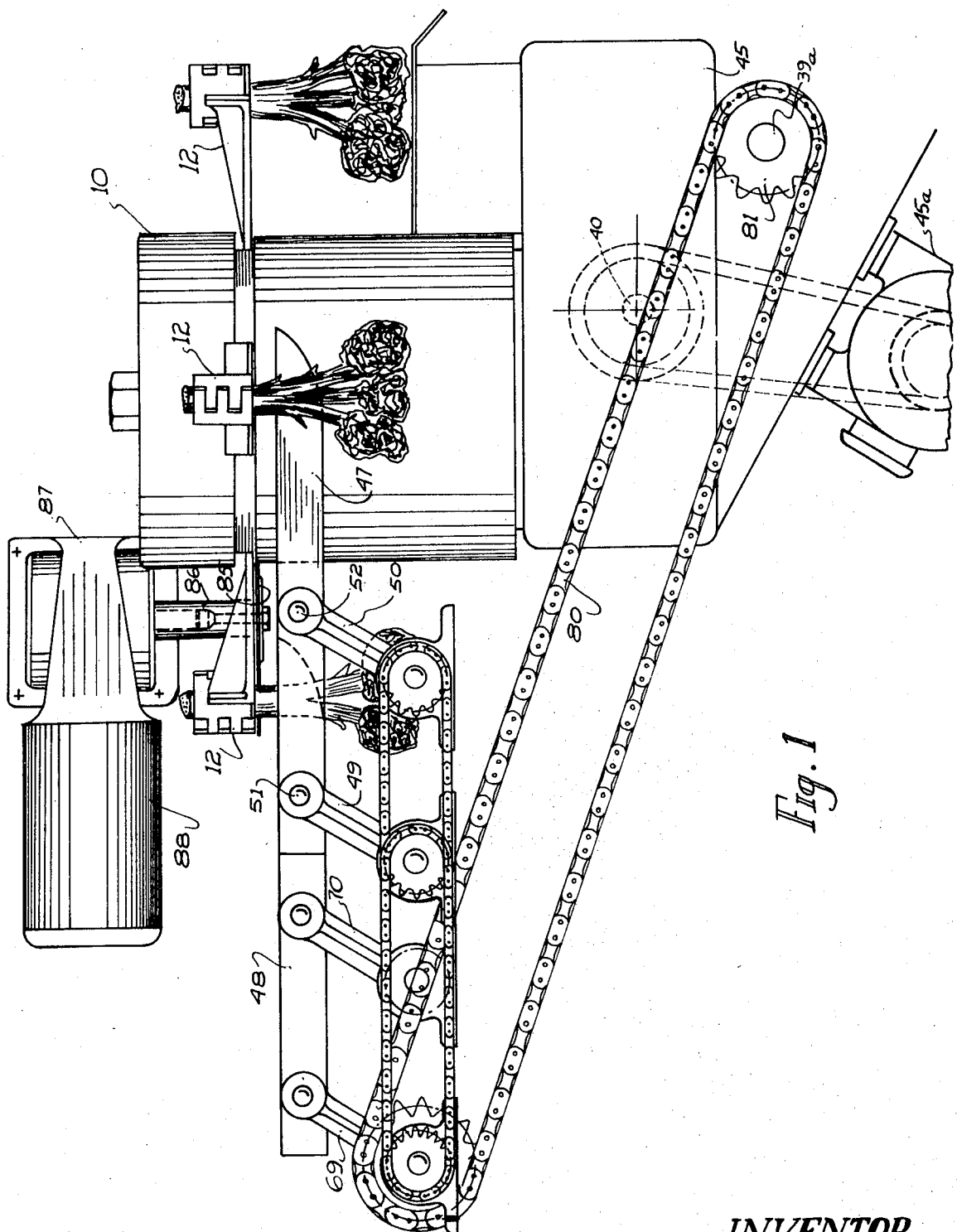
FIG. 1 is a side view of an embodiment of this invention.
Figure 2:
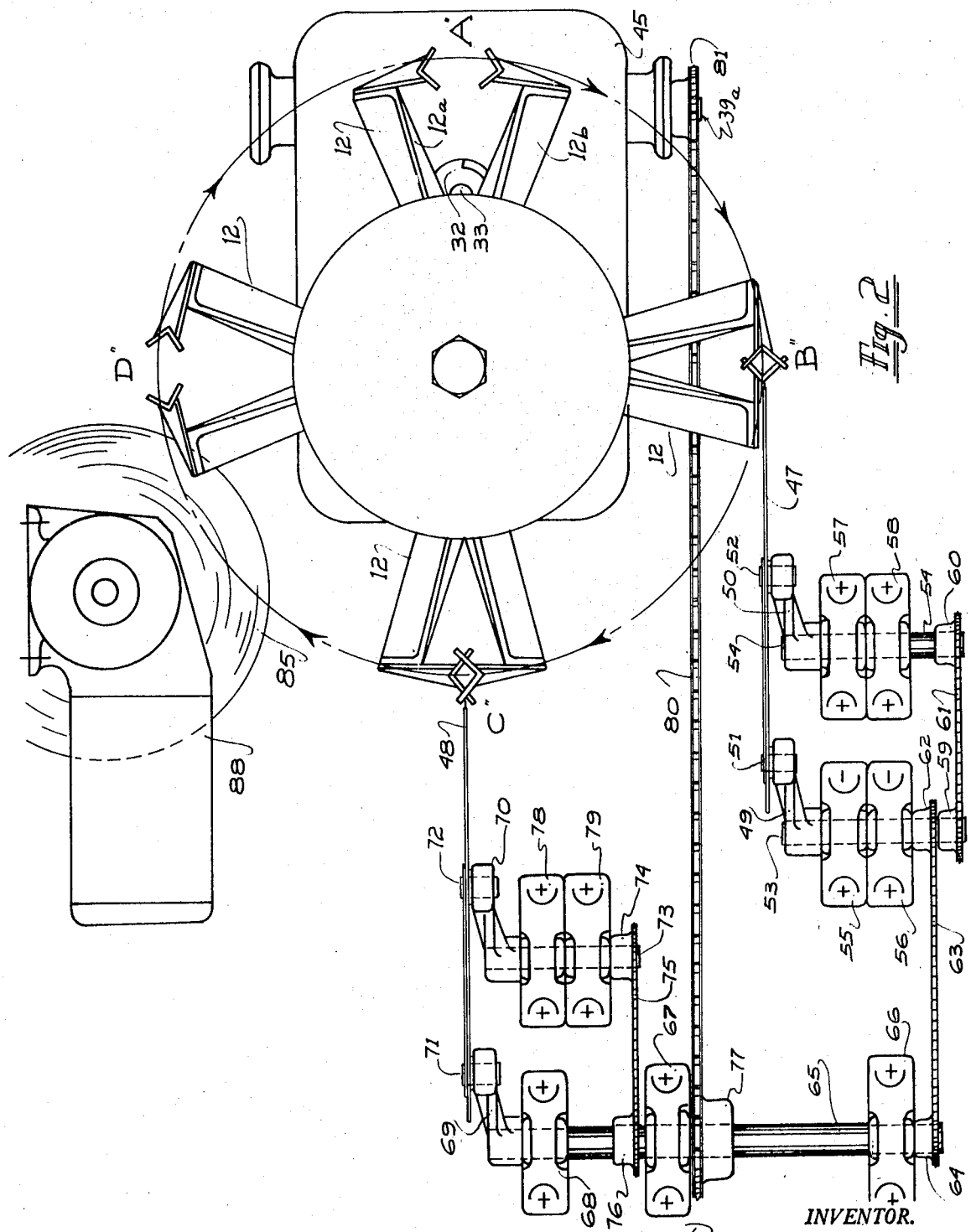
FIG. 2 is a plan view of the apparatus shown in FIG. 1.
Figure 3:
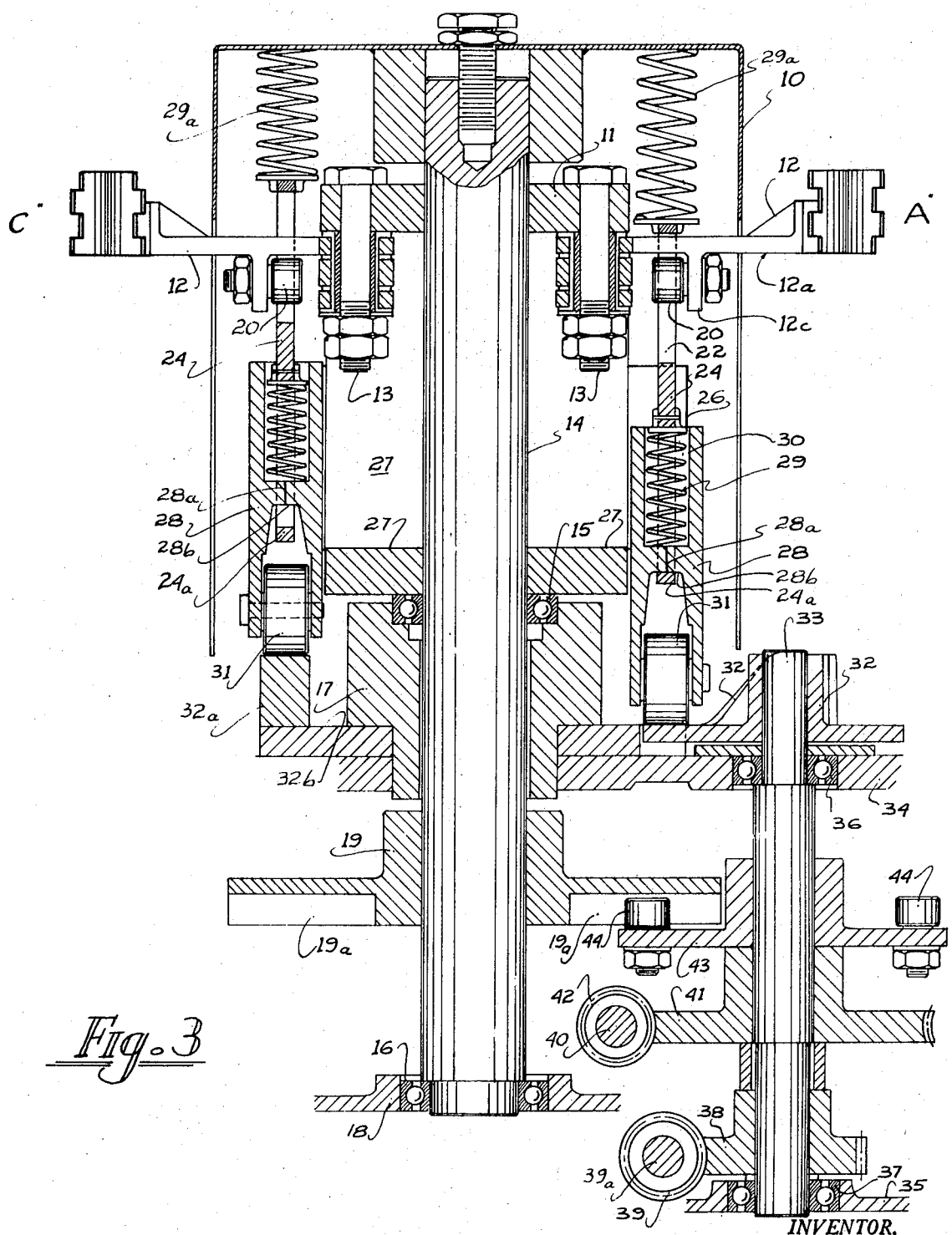
FIG. 3 is a vertical sectional view taken through the motor driven transmission unit and the rotatable mechanism supporting the broccoli gripping devices.

Referring to the drawing in detail reference numeral 10 designates a housing which encloses a turret 11 to which there are attached a plurality of jaws 12 which are adapted to grip stalks of broccoli as shown in FIG. 1. The embodiment of this apparatus disclosed herein is provided with four jaw sets 12 as shown in FIG. 2, although more or less numbers of jaw sets may be employed if desired and these jaw sets are adapted to be moved in a circular path past the broccoli loading station A, cutting stations B and C and discharge station D. Each of the jaw sets is provided with two jaws and each set is pivotally supported on the rotary plate 11 by a bolt 13 as shown in FIG. 3.

Plate 11 is fixedly attached to the vertical shaft 14 which is rotatably supported by ball bearings 15 and 16 on the members 17 and 18, respectively. A Geneva cam 19 is fixedly attached to the shaft 14 for rotation of this shaft in step-by-step motion. Each of the jaw sets 12 is provided with a pair of arms 12a and 12b which are pivotally supported by the bolt 13. The arms 12a and 12b are adapted to be rotated so that the outer ends thereof are movable toward and away from each other. The outer ends of the jaws are provided with angularly shaped parts which have portions thereof that are adapted to interleave when the jaws are closed so as to get a firm grip on the stem of broccoli and support the broccoli while it is being divided by suitable knives as will be described hereinafter.

The arms 12a and 12b are provided with rollers 20 and 21, respectively, and these rollers are adapted to engage the inclined cam surfaces 22 and 23, respectively, as shown in FIG. 4. While the rollers 20 and 21 are shown as surrounding the arms 12a and 12b, respectively, of the jaw set in FIG. 4, they may be attached to the arms of the jaw set by projecting brackets such as the bracket 12c shown in FIG. 3 depending from the arm 12a. The inclined cam surfaces 22 and 23 form the inner surfaces of a recess provided to the member 24 which is slidably supported between the guide members 25 and 26. Members 25 and 26 are attached to the member 27 which is fixedly attached to the rotatable shaft 14. Thus the members 24 which are associated with the jaw sets are supported by the shaft 14 and they are rotatable therewith.

The bottom parts of each of the members 24 are provided with cam followers 28. Each cam follower 28 is made in two parts joined along line 28a and held assembled by suitable bolts (not shown). When the parts of the cam followers 28 are assembled with the member 24 a coil spring 29 is provided in the recess 30 for the purpose of pressing the cam follower 28 downward so that the surface 28b of the follower engages the part 24a of member 24 when the follower is at its lowermost position. Cam followers 28 are each provided with a roller 31 pivotally attached to the bottom thereof. A small elevator cam 32 is fixedly attached to the shaft 33 which is supported on members 34 and 35 by ball bearings 36 and 37, respectively. Another spring 29a is provided between the tops of each of the members 24 and the housing 10 to urge the members 24 downward. Thus these members 24 are urged downward by springs 29a which engage the tops of these members while the cam followers 28 are urged downward by springs 29. Actually springs 29 also urge members 24 upward particularly when the follower rollers 31 are elevated on cam 32a.

Shaft 33 which is attached to elevator cam 32 is rotated by gear 41 which is fixedly attached thereto and which is driven by the worm 42. Worm 42 is attached to the shaft 40 which is driven by the motor 45a. The shaft 33 is also provided with a gear 38 which meshes with the pinion gear 39 to drive the shaft 39a for the purpose to be described hereinafter. The Geneva cam actuator 43 is also keyed to the shaft 33 and this actuator is provided with rollers 44 which are adapted to engage the slots 19a of the Geneva cam and drive this cam in step-by-step fashion when the actuator 43 is rotated by the gear 41.

This apparatus is provided with two slitting knives 47 and 48 shown in FIGS. 1 and 2. Knife 47 is supported on rotatable arms 49 and 50 by the bolts 51 and 52, respectively, and these arms are fixedly attached to the shafts 53 and 54. Shaft 53 is supported by the bearings 55 and 56 and shaft 54 is supported by bearings 57 and 58. Suitable sprockets 59 and 60 are provided to the shafts 53 and 54, respectively, and these sprockets are connected by a chain 61. In addition shaft 53 is provided with the sprocket 62 which is adapted to be driven by the chain 63 whereby both shafts 53 and 54 are rotated and the arms 49 and 50 which carry the slitting knife 47 are turned. Thus the knife 47 is moved through a predetermined orbit with respect to station B and it slits the broccoli which has been moved into this station by the gripping device 12.

The slitting knife 48 is positioned adjacent to station C and this knife is supported on the rotatable arms 69 and 70 by the bolts 71 and 72, respectively. Arms 69 and 70 are attached to the shafts 65 and 73, respectively. Shaft 65 is supported by the bearings 66, 67, and 68 and it is also provided with sprockets 64, 76, and 77 which are attached thereto. Shaft 73 is supported by the bearings 78 and 79 and it is provided with a sprocket 74 which is attached thereto. A drive chain 75 is provided between sprockets 74 and 76 and shaft 73 is rotated in unison with shaft 65. Shaft 65 is also provided with a sprocket 77 which is driven by the drive chain 80 from sprocket 81 which attached to shaft 39a of the transmission unit 45. Shaft 65 is also provided with a sprocket 64 which drives shaft 53 through chain 63.

The turret including the shaft 14 and jaw sets 12, is rotated by the motor 45a through the transmission unit 45, which includes the Geneva drive 19–43, so that the jaw sets 12 are brought to loading station A in sequence. The jaw sets 12 are allowed to open just before they arrive at station D because the cam 32a drops down to the level of plate 32b and the roller 31 of the cam follower 28 drops to this level. Thus member 24 which carries the cams 22 and 23 is pushed down by spring 29a against some restraint by spring 29, to its lower position shown in FIG. 4 and spring 13a which is attached to the arms of the jaws, moves jaws 12a and 12b to their open position. Spring 13a may be either a leaf spring or a coil spring as desired. The jaws remain open as they are moved from station D to station A. The operator places the broccoli into the open jaws at station A. Shaft 33 rotates the elevator cam 32 and lifts cam follower 28 and member 24 so that the jaws are closed through the operation of cams 22 and 23 to grip the broccoli.

The turret is then rotated a quarter turn by the Geneva drive and the roller 31 of the cam follower 28 moves onto cam 32a shown in FIG. 4 so that the jaws remain closed and carry the broccoli to station B. Movement of the turret and the jaw set with the broccoli gripped is temporarily arrested by the action of the Geneva drive so that the knife 47 can slit the broccoli at station B. Knife 47 is inserted into the broccoli at station B as shown in FIG. 2. This knife is then moved downward by arms 49 and 50 to slit the broccoli all the way down. The turret is then rotated another quarter turn by the Geneva drive to move the broccoli to station C and at the same time the broccoli is rotated a quarter turn with respect to the next knife 48. Knife 48 is inserted into the broccoli at station C by the rotating arms 69 and 70 which then move the knife downward and slit the broccoli. The broccoli is now divided into quarters from the jaws downward.

A rotary cutoff knife 85 is supported by the shaft 86 just ahead of station D as shown in FIGS. 1 & 2. This knife is supported horizontally just below the broccoli engaging or gripping means as shown in FIG. 1. The knife 85 is rotated by the electric motor 88 which is mechanically coupled to the shaft 86 through the gear box 87. Thus the blade 85 cuts off the quartered broccoli just below the gripping means as the broccoli is moved from station C to station D. The severed part of the broccoli which is the desired part drops down to a suitable receptacle or conveyor (not shown) after it is severed and the portion of the broccoli that was gripped in the gripping means is released and dropped down to another receiving means (not shown) after this gripping means enters station D.

In FIG. 5 there is shown a modified jaw operating arrangement which does not require the use of a spring for opening the jaws. In this modification the rollers 20 and 21 which are mounted on the jaws 12a and 12b respectively, are movable in the slots 22a and 23a formed in the member 24b which corresponds to member 24 shown in FIG. 4.

While I have shown and described a preferred embodiment of the invention, it will be apparent that the invention is capable of variation and modification from the form shown so that the scope thereof should be limited only by the proper scope of the claims appended hereto.

I claim:

1. In apparatus for slitting and trimming broccoli, the combination comprising means gripping the stem of the broccoli adjacent to where it was severed from the plant, knife means, said knife means comprising a pointed blade, means providing relative motion between said pointed blade and said broccoli, said last-mentioned means thrusts said pointed blade into said broccoli and slits the desired part thereof in its lengthwise direction, means severing the slit portion of said broccoli from the gripped stem portion and means causing said gripping means to release its grip on said stem portion.

2. In apparatus for slitting and trimming broccoli as set forth in claim 1 further characterized in that said knife means comprises a second pointed knife blade, rotatable means, said rotatable means comprising a pair of rotatable arms supporting each of said knife blades and said means providing relative motion includes means rotating each of said pair of arms to thrust said blades supported thereby into the broccoli to slit the broccoli lengthwise into four quarters, and means moving said quartered broccoli from said blades.

3. In apparatus for trimming broccoli, the combination comprising means supporting broccoli adjacent to where it was severed from the plant, a pair of knives, means rotating said supporting means to present the supported broccoli to one of said knives, means moving said one knife through a predetermined orbit so that said one knife slits the supported broccoli in its lengthwise direction, said rotating means rotating said supported broccoli to the other of said knives, said moving means moving said other knife, slitting said broccoli lengthwise substantially at right angles to the slit made by said one knife.

4. In apparatus for trimming broccoli, the combination as recited in claim 3, further characterized in that said broccoli supporting means comprises a plurality of gripping devices attached to a rotatable turret, said devices each having a pair of jaws, means rotating said turret step-by-step through a plurality of stations, the first of said stations being a loading station, means opening said jaws to receive the broccoli at the loading station, said one of said pair of knives being positioned at the second of said stations and the other of said knives being positioned at the third of said stations following said loading station, said means rotating said turret temporarily stopping the rotation at said second and third stations to permit slitting the broccoli by said knives.

5. In apparatus for trimming broccoli, the combination as recited in claim 3, further characterized in that each of said broccoli supporting means comprises a pair of jaws, means closing said jaws to grip the broccoli therebetween, said closing means comprising opposed inclined surfaces, said jaws having means engaging said inclined surfaces, and means moving said inclined surfaces to close or open said jaws.

6. In apparatus for trimming broccoli, the combination as recited in claim 5, further characterized in that said means moving said inclined surfaces comprises a rotatable cam and said rotating means also includes means rotating said cam.

7. In apparatus for trimming broccoli, the combination as recited in claim 6, further characterized in that said closing means comprises a member with said inclined surfaces, a cam follower attached to said member, said follower engaging said cam and actuating said member to close said jaws.

8. In apparatus for trimming broccoli, the combination as recited in claim 7, further characterized in that said member and said cam follower are provided with a spring positioned therebetween, said spring actuating said member when said follower engages said cam.

9. In apparatus for trimming broccoli, the combination as recited in claim 4, further comprising means holding said jaws closed gripping the broccoli while said broccoli is being slit and means cutting the broccoli off below said jaws after said broccoli is slit into quarters, the grip of said jaws on the discarded part of said broccoli being released after said broccoli is quartered and the desired part thereof is cut off by said last mentioned means.

10. In apparatus for slitting and trimming broccoli, as set forth in claim 1, further characterized in that said pointed blade is thrust into the broccoli adjacent to said gripping means and said motion providing means moves said blade downward to slit the entire length of the broccoli.

* * * * *